United States Patent
Golla et al.

(10) Patent No.: US 7,509,484 B1
(45) Date of Patent: Mar. 24, 2009

(54) HANDLING CACHE MISSES BY SELECTIVELY FLUSHING THE PIPELINE

(75) Inventors: Robert T. Golla, Round Rock, TX (US); Mark A. Luttrell, Cedar Park, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 430 days.

(21) Appl. No.: 10/882,807

(22) Filed: Jun. 30, 2004

(51) Int. Cl.
*G06F 9/30* (2006.01)
*G06F 9/40* (2006.01)
*G06F 9/00* (2006.01)

(52) U.S. Cl. .................. 712/225; 712/229; 712/203

(58) Field of Classification Search .............. 712/225, 712/229, 203
See application file for complete search history.

(56) References Cited

U.S. PATENT DOCUMENTS

| | | | |
|---|---|---|---|
| 4,816,997 A | 3/1989 | Scales, III et al. | |
| 4,851,990 A | 7/1989 | Johnson et al. | |
| 5,446,854 A | 8/1995 | Khalidi et al. | |
| 5,465,337 A | 11/1995 | Kong | |
| 5,479,627 A | 12/1995 | Khalidi et al. | |
| 5,596,293 A | 1/1997 | Rogers et al. | |
| 5,712,791 A | 1/1998 | Lauterbach | 364/489 |
| 5,717,885 A | 2/1998 | Kumar et al. | |
| 5,761,511 A | 6/1998 | Gibbons et al. | |
| 5,802,341 A | 9/1998 | Kline et al. | |
| 5,842,225 A | 11/1998 | Kohn | |
| 5,860,147 A | 1/1999 | Gochman et al. | |
| 5,862,450 A | 1/1999 | Mandal et al. | 455/3.1 |
| 5,895,487 A | 4/1999 | Boyd et al. | |
| 5,899,994 A | 5/1999 | Mohamed et al. | |
| 5,900,011 A | 5/1999 | Saulsbury et al. | |
| 5,911,071 A | 6/1999 | Jordan | |
| 5,918,005 A | 6/1999 | Moreno et al. | |
| 5,933,627 A | 8/1999 | Parady | 395/569 |
| 5,953,010 A | 9/1999 | Kampe et al. | |
| 5,956,756 A | 9/1999 | Khalidi et al. | |
| 5,991,790 A | 11/1999 | Shah et al. | |
| 6,006,288 A | 12/1999 | McIntyre, Jr. et al. | |
| 6,016,542 A | 1/2000 | Gottlieb et al. | 712/225 |
| 6,044,446 A | 3/2000 | Joy et al. | |

(Continued)

OTHER PUBLICATIONS

Ron Kalla et al., IBM Power5 Chip: A Dual-Core Multithreaded Processor, Apr. 2004.*

(Continued)

*Primary Examiner*—Alford W Kindred
*Assistant Examiner*—Jesse R Moll
(74) *Attorney, Agent, or Firm*—Osha • Liang LLP

(57) ABSTRACT

An apparatus and method for efficiently managing data cache load misses is described in connection with a multithreaded, pipelined multiprocessor chip. A CMT processor keeps track of load misses for each thread by issuing a load miss signal each time a load instruction to the data cache misses. A detection logic functionality in the IFU responds the load miss signal to determine if a valid instruction from the thread is at the one of the pipeline stages. If no instructions from the thread are detected in the pipeline, then no flush is required and the thread is placed in a wait state until the requested data is returned from higher order memory. If any instruction from the thread is detected in the pipeline, the thread is flushed and the instruction is re-fetched.

21 Claims, 7 Drawing Sheets

U.S. PATENT DOCUMENTS

| | | | |
|---|---|---|---|
| 6,092,154 A | 7/2000 | Curtis et al. | 711/137 |
| 6,098,169 A | 8/2000 | Ranganathan | 712/227 |
| 6,105,127 A | 8/2000 | Kimura et al. | |
| 6,141,692 A | 10/2000 | Loewenstein et al. | 709/234 |
| 6,199,142 B1 | 3/2001 | Saulsbury et al. | |
| 6,247,121 B1 | 6/2001 | Akkary et al. | 712/239 |
| 6,272,520 B1* | 8/2001 | Sharangpani et al. | 718/108 |
| 6,295,600 B1 | 9/2001 | Parady | 712/228 |
| 6,308,279 B1 | 10/2001 | Toll et al. | 713/323 |
| 6,311,261 B1 | 10/2001 | Chamdani et al. | |
| 6,314,563 B1 | 11/2001 | Agesen et al. | 717/9 |
| 6,374,349 B1 | 4/2002 | McFarling | |
| 6,408,368 B1 | 6/2002 | Parady | |
| 6,449,694 B1 | 9/2002 | Burgess, Jr. et al. | |
| 6,493,819 B1 | 12/2002 | Mahurin et al. | |
| 6,535,905 B1 | 3/2003 | Kalafatis et al. | 709/108 |
| 6,578,137 B2 | 6/2003 | Parady | 712/228 |
| 6,609,193 B1 | 8/2003 | Douglas et al. | 712/219 |
| 6,625,654 B1 | 9/2003 | Wolrich et al. | 709/230 |
| 6,633,984 B2 | 10/2003 | Susser et al. | 713/201 |
| 6,671,707 B1 | 12/2003 | Hudson et al. | 707/206 |
| 6,700,410 B2 | 3/2004 | Ebergen | 326/93 |
| 6,700,825 B1 | 3/2004 | Ebergen | 365/221 |
| 6,715,057 B1 | 3/2004 | Kessler et al. | |
| 6,718,438 B2 | 4/2004 | Lewis et al. | |
| 6,718,494 B1 | 4/2004 | Jamil et al. | |
| 6,732,143 B1 | 5/2004 | Saulsbury | |
| 6,751,655 B1 | 6/2004 | Deutsch et al. | |
| 6,766,428 B2 | 7/2004 | Saulsbury et al. | |
| 6,772,369 B2 | 8/2004 | Smith et al. | |
| 6,779,087 B2 | 8/2004 | Saulsbury et al. | |
| 6,802,039 B1 | 10/2004 | Quach et al. | |
| 6,816,961 B2 | 11/2004 | Rice et al. | |
| 6,823,473 B2 | 11/2004 | Mukherjee | |
| 6,854,075 B2 | 2/2005 | Mukherjee et al. | |
| 6,862,027 B2 | 3/2005 | Andrews et al. | |
| 6,965,982 B2 | 11/2005 | Nemawarkar | |
| 2001/0034824 A1 | 10/2001 | Mukherjee et al. | |
| 2001/0047468 A1 | 11/2001 | Parady | 712/228 |
| 2002/0052926 A1 | 5/2002 | Bush et al. | 709/217 |
| 2002/0087840 A1* | 7/2002 | Kottapalli et al. | 712/219 |
| 2002/0129309 A1 | 9/2002 | Floyd et al. | 714/724 |
| 2002/0162092 A1 | 10/2002 | Ravichandran | |
| 2003/0002974 A1 | 1/2003 | Gunnarsson | |
| 2003/0088610 A1 | 5/2003 | Kohn et al. | 709/107 |
| 2003/0097518 A1 | 5/2003 | Kohn et al. | 711/5 |
| 2003/0105756 A1 | 6/2003 | Daynes | 707/8 |
| 2003/0105907 A1 | 6/2003 | Kohn et al. | 710/305 |
| 2003/0120825 A1 | 6/2003 | Avvari et al. | 709/316 |
| 2003/0131277 A1 | 7/2003 | Taylor et al. | |
| 2003/0149861 A1 | 8/2003 | Becker | 712/214 |
| 2003/0163645 A1 | 8/2003 | Tremblay et al. | 711/137 |
| 2003/0191927 A1 | 10/2003 | Joy et al. | 712/228 |
| 2003/0212874 A1 | 11/2003 | Alderson | 711/170 |
| 2004/0002974 A1 | 1/2004 | Kravitz et al. | 707/8 |
| 2004/0003208 A1 | 1/2004 | Damron | 712/225 |
| 2004/0003211 A1 | 1/2004 | Damron | 712/228 |
| 2004/0006633 A1 | 1/2004 | Chandra et al. | 709/231 |
| 2004/0034853 A1 | 2/2004 | Gibbons et al. | 717/174 |
| 2004/0073906 A1 | 4/2004 | Chamdani et al. | 718/102 |
| 2004/0088487 A1 | 5/2004 | Barroso et al. | |
| 2004/0098496 A1 | 5/2004 | Wolrich et al. | |
| 2004/0148472 A1 | 7/2004 | Barroso et al. | |
| 2005/0114856 A1* | 5/2005 | Eickemeyer et al. | 718/100 |
| 2005/0138333 A1* | 6/2005 | Samra | 712/218 |
| 2005/0193283 A1 | 9/2005 | Reinhardt et al. | |

OTHER PUBLICATIONS

R. Heald et al., "A Third-Generation SPARC V9 64-b Microprocessor," IEEE JSSC, Nov. 2000, pp. 1526-1538.

"Igniting a Computing Revolution! Throughput Computing," Sun Microsystems Brochure.

"Introduction to Throughput Computing," Sun Microsystems whitepaper, Feb. 2003.

D. Wendell et al., "A 4 MB On-Chip L2 Cache for a 90nm 1.6GHz 64 bit Microprocessor," IEEE JSSC (Feb. 2004).

G. Konstadinidis et al., "Implementation of a Third-Generation 1.1GHz 64b Microprocessor," 2002 IEEE Journal of Solid-State Circuits, vol. 37, No. 11, pp. 1461-1469 (Nov. 2002).

K. Krewell, "Sun Weaves Multithreaded Future," Microprocessor Report, Reed Electronics Group (Apr. 14, 2003).

"UltraSPARC® IV Processor," User's Manual Supplement, Sun Microsystems, version 1.0 (Apr. 2004).

"UltraSPARC® IV Processor," Datasheet, Sun Microsystems.

"The UltraSPARC® IIIi Processor" Architecture Overview, Technical Whitepaper, Sun Microsystems, version 1.2 (Apr. 2004).

"UltraSPARC® IV Processor," Architecture Overview, Technical Whitepaper, Sun Microsystems, Version 1.0 (Feb. 2004).

R. Ronen, "VLSI Architecture Design Course," Lecture #10, Multithreaded Architectures (dated May 2003).

K. Mai et al., "Smart Memories: A Modular Reconfigurable Architecture," Stanford University Proceedings of the 27th ISCA (Jun. 2000).

L. Hammond et al., "The Stanford Hydra CMP," IEEE Micro, pp. 71-84, (Mar.-Apr. 2000).

L. Hammond et al., "Considerations in the Design of Hydra: A Multiprocessor-on-a-Chip Microarchitecture," Technical Report No. CSL-TR-98-749, pp. 1-10 (Feb. 1998).

K. Privitt, et al., "Threading: Connecting the Pieces, System Architecture, Application, OS and Tools," Intel Developer Forum (Feb. 17-19, 2004).

Hennessy, John, Patterson, David., "Computer Architecture: A Quantitative Approach," Morgan Kaufmann, third edition, pp. A-68 to A77.

Handy, Jim. The Cache Memory Book: Academic Press Ltd 2nd Ed. 1998. pp. 42-45, 89-94.

Wikipedia, Thread (computer science). Version as of Jan. 5, 2004. Accessed Jan. 3, 2007. http://en.wikipedia.org/wiki/Thread_(computer_science).

Mukherjee, S. et al., "Detailed Design and Evaluation of Redundant Multithreading Alternatives," Computer Architecture, 2002, Proceedings 29th Annual International Symposium, pp. 1-12.

Reinhardt, S.K. et al., "Transient Fault Detection via Simultaneous Multithreading," Computer Architecture, 2000, Proceedings of the 27th International Symposium, 12 pages.

Watanabe, K. et al., "Exploiting Java Instruction/Thread Level Parallelism with Horizontal Multithreading," IEEE, 2001, pp. 122-129.

Hoe, J.C. "Superscalar Out-of-Order Demystified in Four Instructions," 2003, http://www.ece.cmu:edu/~jhoe/distribution/2003/wcae03.pdf, pp. 1-6.

Chen, S. et al., "Out-of-Order Memory Accesses Using a Load Wait Buffer," http://www.ece.cmu.edu/~schen1/18-741_final_report.pdf, pp. 1-8.

Kharbutli, M. et al., "Using Prime Numbers for Cache Indexing to Eliminate Conflict Misses," 10th Annual Symposium on High Performance Computer Architecture, Feb. 14-18, 2004, 12 pages.

\* cited by examiner

| | 0 | 1 | 2 | 3 | 4 | 5 | 6 | 7 |
|---|---|---|---|---|---|---|---|---|
| Fetch (F) 70 | T0 | T3 | T6 | T2 | T7 | T5 | T1 | T4 |
| Cache (C) 71 | | T0 | T3 | T6 | T2 | T7 | T5 | T1 |
| Pick (P) 72 | | | T0 | T3 | T6 | T2 | T7 | T5 |
| Decode (D) 73 | | | | T0 | T3 | T6 | T2 | T7 |
| Execute (E) 74 | | | | | T0 | T3 | T6 | T2 |
| Memory (M) 75 | | | | | | T0 | T3 | T6 |
| Bypass (B) 76 | | | | | | | T0 | T3 |
| Writeback (W) 77 | | | | | | | | T0 |
| Execution cycle | 0 | 1 | 2 | 3 | 4 | 5 | 6 | 7 |

*Figure 5*

HANDLING CACHE MISSES BY SELECTIVELY FLUSHING THE PIPELINE

BACKGROUND OF THE INVENTION

1. Field of the Invention

The present invention relates generally to the field of processor or computer design and operation. In one aspect, the present invention relates to pipelined instruction and data operations in a multithreaded processor.

2. Description of the Related Art

Computer systems are constructed of many components, typically including one or more processors that are connected for access to one or more memory devices (such as RAM) and secondary storage devices (such as hard disks and optical discs). For example, FIG. 1 is a diagram illustrating a computer system 10 with multiple memories. Generally, a processor 1 connects to a system bus 12. Also connected to the system bus 12 is a memory (e.g., 14). During processor operation, CPU 2 processes instructions and performs calculations. Data for the CPU operation is stored in and retrieved from memory using a memory controller 8 and cache memory, which holds recently or frequently used data or instructions for expedited retrieval by the CPU 2. Specifically, a first level (L1) cache 4 connects to the CPU 2, followed by a second level (L2) cache 6 connected to the L1 cache 4. The CPU 2 transfers information to the L2 cache 6 via the L1 cache 4. Such computer systems may be used in a variety of applications, including as a server 10 that is connected in a distributed network, such as Internet 9, enabling server 10 to communicate with clients A-X, 3, 5, 7.

Because processor clock frequency is increasing more quickly than memory speeds, there is an ever increasing gap between processor speed and memory access speed. In fact, memory speeds have only been doubling every six years-one-third the rate of microprocessors. In many commercial computing applications, this speed gap results in a large percentage of time elapsing during pipeline stalling and idling, rather than in productive execution, due to cache misses and latency in accessing external caches or external memory following the cache misses. Stalling and idling are most detrimental, due to frequent cache misses, in database handling operations such as OLTP, DSS, data mining, financial forecasting, mechanical and electronic computer-aided design (MCAD/ECAD), web servers, data servers, and the like. Thus, although a processor may execute at high speed, much time is wasted while idly awaiting data.

One technique for reducing stalling and idling is hardware multithreading to achieve processor execution during otherwise idle cycles. FIGS. 2a and 2b show two timing diagrams illustrating an execution flow 22 in a single-thread processor and an execution flow 24 in a vertical multithread processor. Processing applications, such as database applications and network computing applications spend a significant portion of execution time stalled awaiting memory servicing. This is illustrated in FIG. 2a, which depicts a highly schematic timing diagram showing execution flow 22 of a single-thread processor executing a database application. The areas within the execution flow 22 labeled as "C" correspond to periods of execution in which the single-thread processor core issues instructions. The areas within the execution flow 22 labeled as "M" correspond to time periods in which the single-thread processor core is stalled waiting for data or instructions from memory or an external cache. A typical single-thread processor executing a typical database application executes instructions about 25% of the time with the remaining 75% of the time elapsed in a stalled condition. The 25% utilization rate exemplifies the inefficient usage of resources by a single-thread processor.

FIG. 2b is a highly schematic timing diagram showing execution flow 24 of similar database operations by a multi-thread processor. Applications, such as database applications, have a large amount inherent parallelism due to the heavy throughput orientation of database applications and the common database functionality of processing several independent transactions at one time. The basic concept of exploiting multithread functionality involves using processor resources efficiently when a thread is stalled by executing other threads while the stalled thread remains stalled. The execution flow 24 depicts a first thread 25, a second thread 26, a third thread 27 and a fourth thread 28, all of which are labeled to show the execution (C) and stalled or memory (M) phases. As one thread stalls, for example first thread 25, another thread, such as second thread 26, switches into execution on the otherwise unused or idle pipeline. There may also be idle times (not shown) when all threads are stalled. Overall processor utilization is significantly improved by multithreading. The illustrative technique of multithreading employs replication of architected registers for each thread and is called "vertical multithreading."

Vertical multithreading is advantageous in processing applications in which frequent cache misses result in heavy clock penalties. When cache misses cause a first thread to stall, vertical multithreading permits a second thread to execute when the processor would otherwise remain idle. The second thread thus takes over execution of the pipeline. A context switch from the first thread to the second thread involves saving the useful states of the first thread and assigning new states to the second thread. When the first thread restarts after stalling, the saved states are returned and the first thread proceeds in execution. Vertical multithreading imposes costs on a processor in resources used for saving and restoring thread states, and may involve replication of some processor resources, for example replication of architected registers, for each thread. In addition, vertical multithreading can overwhelm the instruction fetching capabilities of a pipelined processor when a load miss forces a related instruction in a thread to be re-fetched. In particular, many processors speculate that a load request will hit in the cache in order to minimize bubbles in the pipeline. If the load misses in the cache, a flush is typically required in order to ensure the correct update of architectural state. For a single thread machine, it is very likely that the instruction after the load will be in the pipeline when the load miss is detected. If the load is in the pipeline, then a load flush is required of the instructions past the load, and some replay mechanism of the instruction after the load is required. When a replay mechanism is used to re-fetch the instruction after the load, this reduces the overall fetch bandwidth of the processor since the same instructions must be re-fetched.

Accordingly, an improved method and system for handling cache misses in a multithreaded processor are needed that are economical in resources and avoid costly overhead which reduces processor performance. In addition, an efficient processor protocol is needed that reduces or eliminates unnecessary pipeline flush operations to improve the overall fetch bandwidth of the processor. There is also a need for a method and system that efficiently handles first level (L1) data cache misses without imposing unneeded instruction re-fetch penalties, especially for use in highly threaded processor applications. Further limitations and disadvantages of conventional systems will become apparent to one of skill in the art after reviewing the remainder of the present application with reference to the drawings and detailed description which follow.

SUMMARY OF THE INVENTION

Broadly speaking, the present invention is a method and system for handling cache misses in a multithreaded pipelined processor to eliminate unnecessary instruction re-fetch operations by eliminating a flush operation when the instruction after a load miss is not in the pipeline. By eliminating the load flush, the overall fetch bandwidth and multithreaded performance may be improved.

In accordance with various embodiments of the present invention, a method and apparatus provide for efficient handling of memory requests (such as load or store instructions) from a thread that miss the cache by suppressing a pipeline flush for the thread if the pipeline has no follow-on instructions for the thread are in the pipeline. In an embodiment where a single chip multithreaded processor system is implemented with a processor core that includes resources (such as an instruction fetch unit, load store unit, etc.) for forming a multi-stage pipeline and a cache memory (such as a first level data cache or instruction cache memory), a memory controller is provided for generating a cache miss signal when a memory request misses the cache. In response to the cache miss signal, the thread containing the memory request is flushed from the pipeline stages only if an instruction after the load instruction in the thread is detected at any of pipeline stages. But if no instruction from the thread is detected at any of the pipeline stages, then the flush operation is suppressed, and the instructions from the thread are stalled (i.e., placed in a wait state) until load data is returned to the processor core by a higher order memory (such as L2 cache or main memory). In a selected embodiment, an instruction fetch unit uses a fetch unit and pick unit to control the thread flush operations and includes detection logic for monitoring the status of each thread in the pipeline. In addition, the memory controller may be implemented by a load store unit for servicing memory requests (such as load instructions) from the pipeline.

The objects, advantages and other novel features of the present invention will be apparent to those skilled in the art from the following detailed description when read in conjunction with the appended claims and accompanying drawings.

BRIEF DESCRIPTION OF THE DRAWINGS

FIG. 5 is a pipeline diagram illustrating the flow of instructions through one embodiment of a processor core.

DETAILED DESCRIPTION

Figure 1:
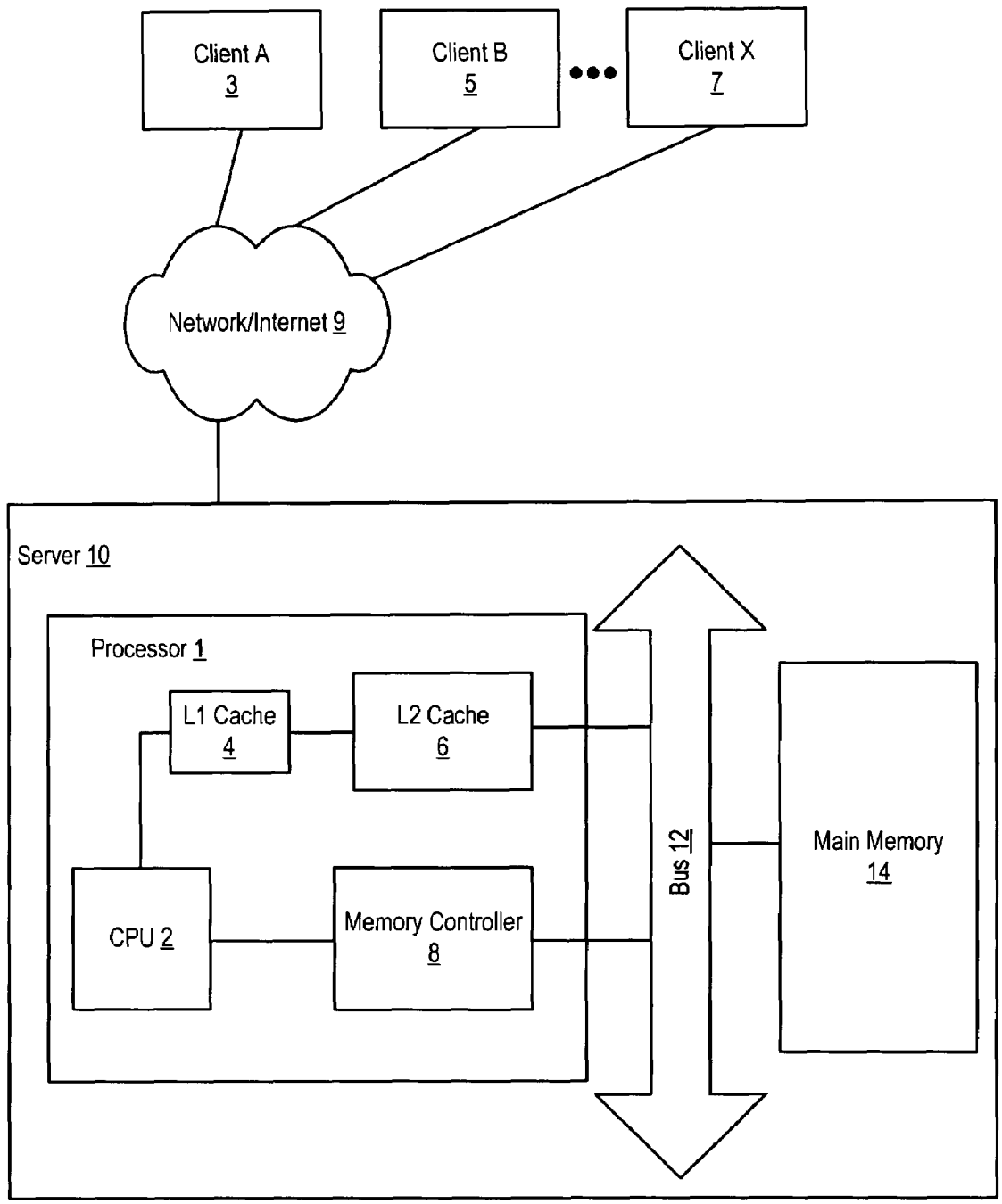
FIG. 1 illustrates a computer system in a communication network.
Figure 2A:
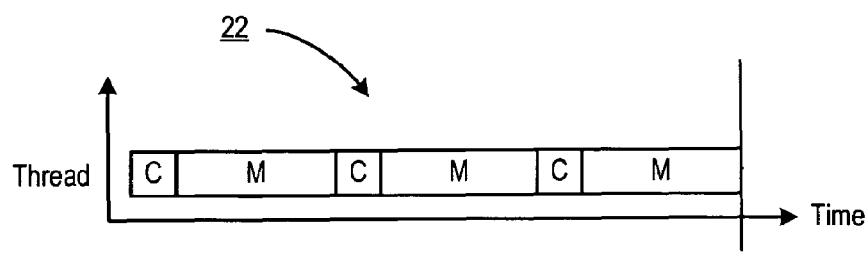
FIGS. 2a and 2b are timing diagrams respectively illustrating execution flows of a single-thread processor and a vertical multithread processor.
Figure 2B:
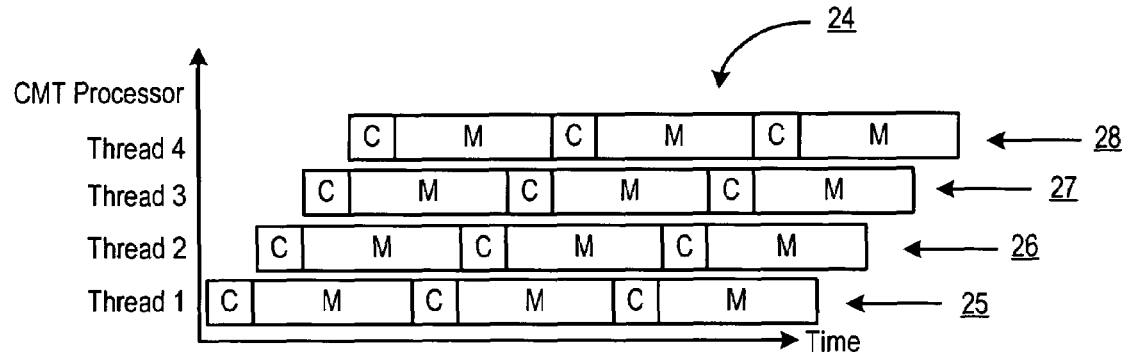
Figure 3:
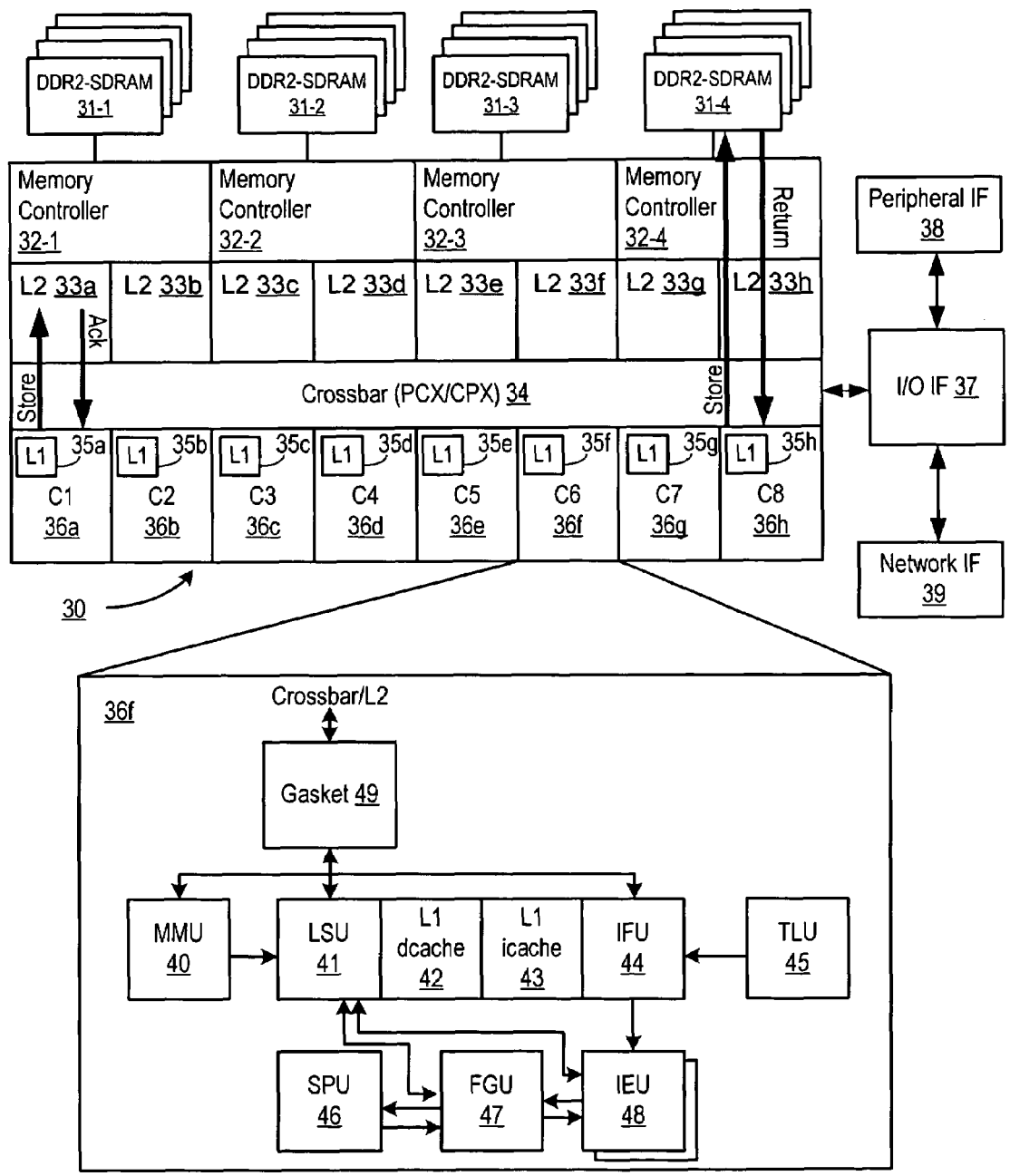
FIG. 3 illustrates a simplified schematic diagram of a processor chip having multiple processor cores for executing multiple threads, wherein each, core contains a first level cache and the multiple cores share a second level cache in accordance with an exemplary embodiment of the invention.

A selected embodiment of the present invention is shown in FIG. 3, which depicts a simplified schematic diagram of a processor chip 30 having multiple processor cores for processing multiple threads. In the illustrated embodiment, processor chip 30 includes a plurality of processor cores 36a-h, which are also designated "C1" though "C8." Each of cores 36 is coupled to an L2 cache 33 via a crossbar 34. L2 cache 33 is coupled to one or more memory controller(s) 32, which are coupled in turn to one or more banks of system memory 31. Additionally, crossbar 34 couples cores 36 to input/output (I/O) interface 37, which is in turn coupled to a peripheral interface 38 and a network interface 39.

Cores 36 may be configured to execute instructions and to process data according to a particular instruction set architecture (ISA). In one embodiment, cores 36 may be configured to implement the SPARC V9 ISA, although in other embodiments, it is contemplated that any desired ISA may be employed, such as x86, PowerPC or MIPS, for example. In a selected embodiment, a highly suitable example of a processor design for the processor core is a SPARC processor core, UltraSPARC processor core or other processor core based on the SPARC V9 architecture. Those of ordinary skill in the art also understand the present invention is not limited to any particular manufacturer's microprocessor design. The processor core may be found in many forms including, for example, the 64-bit SPARC RISC microprocessor from Sun Microsystems, or any 32-bit or 64-bit microprocessor manufactured by Motorola, Intel, AMD or IBM. However, any other suitable single or multiple microprocessors, microcontrollers or microcomputers may be utilized. In the illustrated embodiment, each of cores 36 may be configured to operate independently of the others, such that all cores 36 may execute in parallel. In some embodiments, each of cores 36 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core may also be referred to as a multithreaded (MT) core. In an example embodiment shown in FIG. 3, each processor core includes eight threads. Thus, a single processor chip 30 with eight cores (C1 through C8) will have sixty-four threads in this configuration. However, it should be appreciated that the invention is not limited to eight processor cores, and that more or fewer cores can be included. In other embodiments, it is contemplated that core may process different numbers of threads. The example core 36f includes an instruction fetch unit (IFU) 44 that is coupled to a memory management unit (MMU) 40, a trap logic unit (TLU) 45, and at least one instruction execution unit (IEU) 48. Each of execution units 48 is coupled to both a floating point/graphics unit (FGU) 47 and a load store unit (LSU) 41. Each of the LSU units is also coupled to send data back to each of execution units 48 and FGU unit 47. FGU 47 is coupled to a stream processing unit (SPU) 46. Additionally, LSU 41, IFU 51 and MMU 40 are coupled to a gasket or interface unit 49 for interface to the crossbar 34.

Each processor core 36a-36h is in communication with crossbar 34 which manages data flow between cores 36 and the shared L2 cache 33 and may be optimized for processor traffic where it is desirable to obtain extremely low latency.

The crossbar 34 may be configured to concurrently accommodate a large number of independent accesses that are processed on each clock cycle, and enables communication data requests from cores 36 to L2 cache 33, as well as data responses from L2 cache 33 to cores 36. In one embodiment, crossbar 34 may include logic (such as multiplexers or a switch fabric, for example) that allows any core 36 to access any bank of L2 cache 33, and that conversely allows data to be returned from any L2 bank to any core. Crossbar 34 may also include logic to queue data requests and/or responses, such that requests and responses may not block other activity while waiting for service. Additionally, in one embodiment crossbar 34 may be configured to arbitrate conflicts that may occur when multiple cores attempt to access a single bank of L2 cache 33 or vice versa. Thus, the multiple processor cores 36a-36h share a second level (L2) cache 33 through a crossbar bus 34.

The shared L2 cache 33 accepts requests from the processor cores 36 on the processor to cache crossbar (PCX) 34 and responds on the cache to processor crossbar (CPX) 34. As described herein, the L2 cache 33 is also responsible for maintaining coherency across all caches on the chip by keeping a copy of all L1 tags in a directory structure. The L2 cache 33 includes eight banks that are shared by the processor cores. It should be appreciated that, by sharing L2 cache banks, concurrent access may be made to the multiple banks, thereby defining a high bandwidth memory system. The invention is not limited to eight L2 cache banks or to any particular size, but the illustrated embodiment should be sufficient to provide enough bandwidth from the L2 cache to keep all of the cores busy most of the time. The L2 cache 33 includes an L2 data array and tag array configured to cache instructions and data for use by cores. In the illustrated embodiment, L2 cache 33 may be organized into eight separately addressable banks that may each be independently accessed, such that in the absence of conflicts, each bank may concurrently return data to any of the processor cores 36a-h. In some embodiments, each individual bank may be implemented using set-associative or direct-mapped techniques. For example, in one embodiment, L2 cache 33 may be a 4 megabyte (MB) cache, where each 512 kilobyte (KB) bank (e.g., 55a) is 16-way set associative with a 64 byte (64B) cache line size, although other cache sizes and geometries are possible and contemplated. L2 cache 33 may be implemented in some embodiments as a writeback cache in which written (dirty) data may not be written to system memory until a corresponding cache line is evicted.

In connection with the example described herein, each processor core (e.g., 36f) shares an L2 cache memory 33 to speed memory access and to overcome the delays imposed by accessing remote memory subsystems (e.g., 31). Cache memory comprises one or more levels of dedicated high-speed memory holding recently accessed data, designed to speed up subsequent access to the same data. When data is read from main memory (e.g., 31), a copy is also saved in the L2 cache 33, and an L2 tag array stores an index to the associated main memory. The L2 cache 33 then monitors subsequent requests for data to see if the information needed has already been stored in the L2 cache. If the data had indeed been stored in the cache (i.e., a "hit"), the data is delivered immediately to the processor core 36 and the attempt to fetch the information from main memory 31 is aborted (or not started). If, on the other hand, the data had not been previously stored in L2 cache (i.e., a "miss"), the data is fetched from main memory 31 and a copy of the data and its address is stored in the L2 cache 33 for future access.

In some embodiments, L2 cache 33 may implement queues for requests arriving from and results to be sent to crossbar 34. Additionally, in some embodiments L2 cache 33 may implement a fill buffer configured to store fill data arriving from memory controller 32, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 33 may variously be implemented as single-ported or multi-ported (i.e., capable of processing multiple concurrent read and/or write accesses). In either case, L2 cache 33 may implement arbitration logic to prioritize cache access among various cache read and write requesters.

The L2 cache 33 is in communication with main memory controller 32 to provide access to the external memory 31 or main memory (not shown). Memory controller 32 may be configured to manage the transfer of data between L2 cache 33 and system memory, for example in response to L2 fill requests and data evictions. In some embodiments, multiple instances of memory controller 32 may be implemented, with each instance configured to control a respective bank of system memory. Memory controller 32 may be configured to interface to any suitable type of system memory, such as Double Data Rate or Double Data Rate 2 Synchronous Dynamic Random Access Memory (DDR/DDR2 SDRAM), or Rambus DRAM (RDRAM), for example. In some embodiments, memory controller 32 may be configured to support interfacing to multiple different types of system memory.

In the illustrated embodiment, processor chip 30 may be configured to receive data from sources other than system memory 31. I/O interface 37 may be configured to provide a central interface for such sources to exchange data with cores 36 and/or L2 cache 33 via crossbar 34. In some embodiments, I/O interface 37 may be configured to coordinate Direct Memory Access (DMA) transfers of data between network interface 39 or peripheral interface 38 and system memory 31 via memory controller 32. In addition to coordinating access between crossbar 34 and other interface logic, in one embodiment, I/O interface 37 may be configured to couple processor chip 30 to external boot and/or service devices. For example, initialization and startup of processor chip 30 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor chip 30, before the boot process proceeds to load data from a disk or network device. Additionally, in some embodiments such an external device may be configured to place processor chip 30 in a debug, diagnostic, or other type of service mode upon request.

Peripheral interface 38 may be configured to coordinate data transfer between processor chip 30 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 38 may implement one or more instances of an interface such as Peripheral Component Interface Express (PCI-Express), although it is contemplated that any suitable interface standard or combination of standards may be employed. For example, in some embodiments, peripheral interface 38 may be configured to implement a version of Universal Serial Bus (USB) protocol or IEEE 1394 (Firewire) protocol in addition to or instead of PCI-Express.

Network interface 39 may be configured to coordinate data transfer between processor chip 30 and one or more devices (e.g., other computer systems) coupled to processor chip 30 via a network. In one embodiment, network interface 39 may be configured to perform the data processing necessary to implement an Ethernet (IEEE 802.3) networking standard such as Gigabit Ethernet or 10-gigabit Ethernet, for example, although it is contemplated that any suitable networking standard may be implemented. In some embodiments, network interface 39 may be configured to implement multiple discrete network interface ports.

The multiprocessor chip 30 described herein and exemplified in FIG. 3 may be configured for multithreaded execution. More specifically, in one embodiment, each of cores 36 may be configured to perform fine-grained multithreading, in which each core may select instructions to execute from among a pool of instructions corresponding to multiple threads, such that instructions from different threads may be scheduled to execute adjacently. For example, in a pipelined embodiment of core 36f employing fine-grained multithreading, instructions from different threads may occupy adjacent pipeline stages, such that instructions from several threads may be in various stages of execution during a given core processing cycle.

Figure 4:
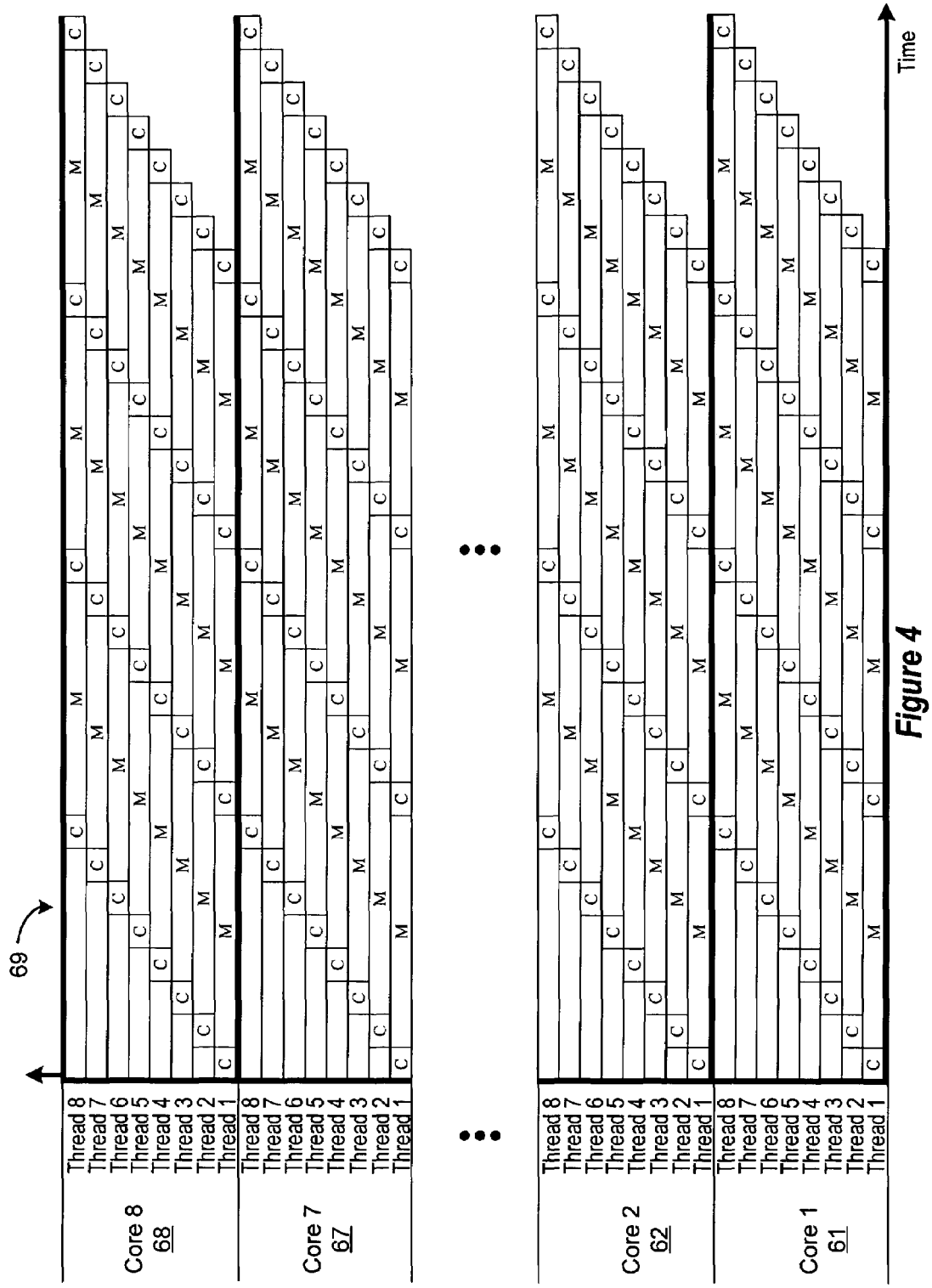
FIG. 4 is a timing diagram illustrating an execution flow of a vertical and horizontal multithread processor in accordance with an illustrative embodiment of the invention.

FIG. 4 is a timing diagram illustrating execution flow of a vertical and horizontal multithread multiprocessor embodiment of the invention using a high throughput architecture with eight processor cores 61-68, each having eight threads. In FIG. 4, the execution flow for a given vertical threaded processor 61 (e.g., Core 1) includes execution of multiple threads (e.g., Threads 1-8). For each thread in each core, the areas labeled "C" show periods of execution and the areas labeled "M" show time periods in which a memory access is underway, which would otherwise idle or stall the processor core. Thus, in the first processor core (Core 1), Thread 1 uses the processor core (during the times labeled as "C") and then is active in memory (during the times labeled as "M"). While Thread 1 in a given core is active in memory, Thread 2 in that same core accesses the processor core and so on for each of Threads 3-8. Vertical multithread processing is implemented by maintaining a separate processing state for each executing thread on a processing core. With only one of the threads being active at one time, each vertical multithreaded processor core switches execution to another thread during a memory access, such as on a cache miss. In this way, efficient instruction execution proceeds as one thread stalls and, in response to the stall, another thread switches into execution on the otherwise unused or idle pipeline. In essence, the pipeline overlaps the execution of multiple threads to maximize processor core pipeline utilization. As will be appreciated, the multiplicity of thread operations from a vertically threaded processor (e.g., core 1) will require pipeline operations that can process multiple references or threads simultaneously. For example, cache load operations for one thread must be coordinated to avoid unnecessary flushes that could impede the processing of other threads by consuming prefetch bandwidth.

In accordance with a selected embodiment of the present invention, the processor cores can be replicated a number of times in the same area. This is also illustrated in FIG. 4, which illustrates the timing diagram for an execution flow of a horizontal threaded processor using a technique called chip multiprocessing. This technique combines multiple processor cores on a single integrated circuit die. By using multiple vertically threaded processors—each of which (e.g., Core 1) is vertically threaded—a processor system is formed with both vertical and horizontal threading, augmenting executing efficiency and decreasing latency in a multiplicative fashion. The execution flow 69 illustrated in FIG. 4 for a vertical and horizontal threaded processor includes execution of threads 1-8 on a first processor core (Core 1), execution of threads 1-8 on a second processor core (Core 2), and so on with processor cores 3-8. Execution of threads 1-8 on the first processor core (Core 1) illustrates vertical threading. Similarly, execution of threads 1-8 on the second processor (Core 2) illustrates vertical threading. Where a single system or integrated circuit includes more than one processor core, the multiple processor cores executing multiple threads in parallel is a chip multithreading (CMT) processor system. The combination of vertical multithreading and horizontal multithreading increases processor parallelism and performance, and attains an execution efficiency that exceeds the efficiency of a processor with only vertical multithreading. The combination of vertical multithreading and horizontal multithreading also advantageously reduces communication latency among local (on-chip) multi-processor tasks by eliminating much signaling on high-latency communication lines between integrated circuit chips. Horizontal multithreading further advantageously exploits processor speed and power improvements that inherently result from reduced circuit sizes in the evolution of silicon processing. However, with the use of vertically and horizontally threaded processors, the coordination requirements for the resulting multiplicity of thread operations from multiple processors (e.g., cores 1-8) will require a system that can reduce accesses to a shared cache or memory which can occur when instruction re-fetch access requests to the shared cache or memory are caused by unnecessary pipeline flushes in the processor cores.

The beneficial effect of the eliminating unnecessary load flush operations in accordance with the present invention may also be illustrated with reference to FIG. 5, which illustrates a pipeline diagram showing the flow of integer instructions through one embodiment of a core (e.g., 36f), whereby multiple threads are pipelined so that processing of new instructions may begin before older instructions have completed, such that multiple instructions from various threads may be in various stages of processing during a given core execution cycle. As a result, multiple instructions from various threads may be in various stages of processing during a given core execution cycle. In the illustrated embodiment, execution of integer instructions is divided into eight stages, denoted as the Fetch (F) stage 70, the Cache stage (C) 71, the Pick stage (P) 72, the Decode (D) stage 73, the Execute (E) stage 74, the Memory (M) stage 75, the Bypass (B) stage 76 and the Write-back (W) stage 77. In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions. Additionally, some of the execution pipelines may be configured to operate concurrently. For example, in one embodiment, a processor core (e.g., 36f) may be configured to execute an integer and a floating-point instruction concurrently, or an integer and a load/store instruction concurrently.

The first four stages (F-C-P-D) of the illustrated integer pipeline 70-77 may generally correspond to the functioning of the instruction fetch unit 44 depicted in FIG. 3. In one embodiment, during the Fetch stage, one or more threads to fetch may be selected, and an instruction cache in the IFU 44 may be accessed for the selected thread. During the Cache stage, a fetch unit in the IFU 44 may determine whether the access of the previous cycle hit or missed the cache. If the access hit, the instructions read from the cache may be stored in instruction buffers. During the Pick stage, a pick unit in the IFU 44 may be configured in one embodiment to select at most two instructions to issue, one for each thread group as described above. Source dependencies of the selected instructions on previously issued instructions may also be detected during the Pick stage. During the Decode stage, a decode unit in the IFU 44 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 48 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 48 during the Execute stage. During the Memory stage of a load instruction, a data cache 42 in the LSU 41 may be accessed, while during the Bypass stage, LSU 41 may determine whether a data cache hit or miss occurred. In the hit case, data may be forwarded to the appropriate execution unit 48 (e.g., depending on the thread group of the load instruction) to be committed during the Writeback stage. In one embodiment, store instructions and load instructions that miss data cache 42 may execute with different pipeline timing than shown in FIG. 5.

In the illustrated embodiment depicted in FIG. 5, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of the instruction fetch unit 44. In some instances, other instructions issued prior to execution cycle 0 may also be in the pipeline. Additionally, in some embodiments, two different instructions from the same or different threads may execute during the same pipeline stage. For example, in the illustrated embodiment, one integer instruction may be issued to each of execution units 48 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the processor core (e.g., 36*f*) described herein, such flushes and stalls may be directed to a single thread in the pipeline, leaving other threads undisturbed. Additionally, even if one thread being processed by a processor core stalls for a significant length of time (for example, due to an L2 cache miss), instructions from another thread may be readily selected for issue, thus increasing overall thread processing throughput.

For a pipelined processor that is handling multiple threads (such as depicted in FIG. 5), a load instruction in one thread (e.g., thread T0) that misses the data cache is not likely to have its follow-on instruction in the pipeline, due to the presence of other threads being processed in the pipeline. This is illustrated in FIG. 5 at cycle 6, where thread T0 (at the bypass stage) is followed in the pipeline by threads T3, T6, T2, T7, T5 and T1. A selected embodiment of the present invention attempts to exploit this likelihood by monitoring each thread and only requiring a load flush for the thread if the follow-on instruction after the load is in the pipeline when the load miss is detected. By eliminating the load flush, the overall fetch bandwidth and multithreaded performance may be improved.

Figure 6:
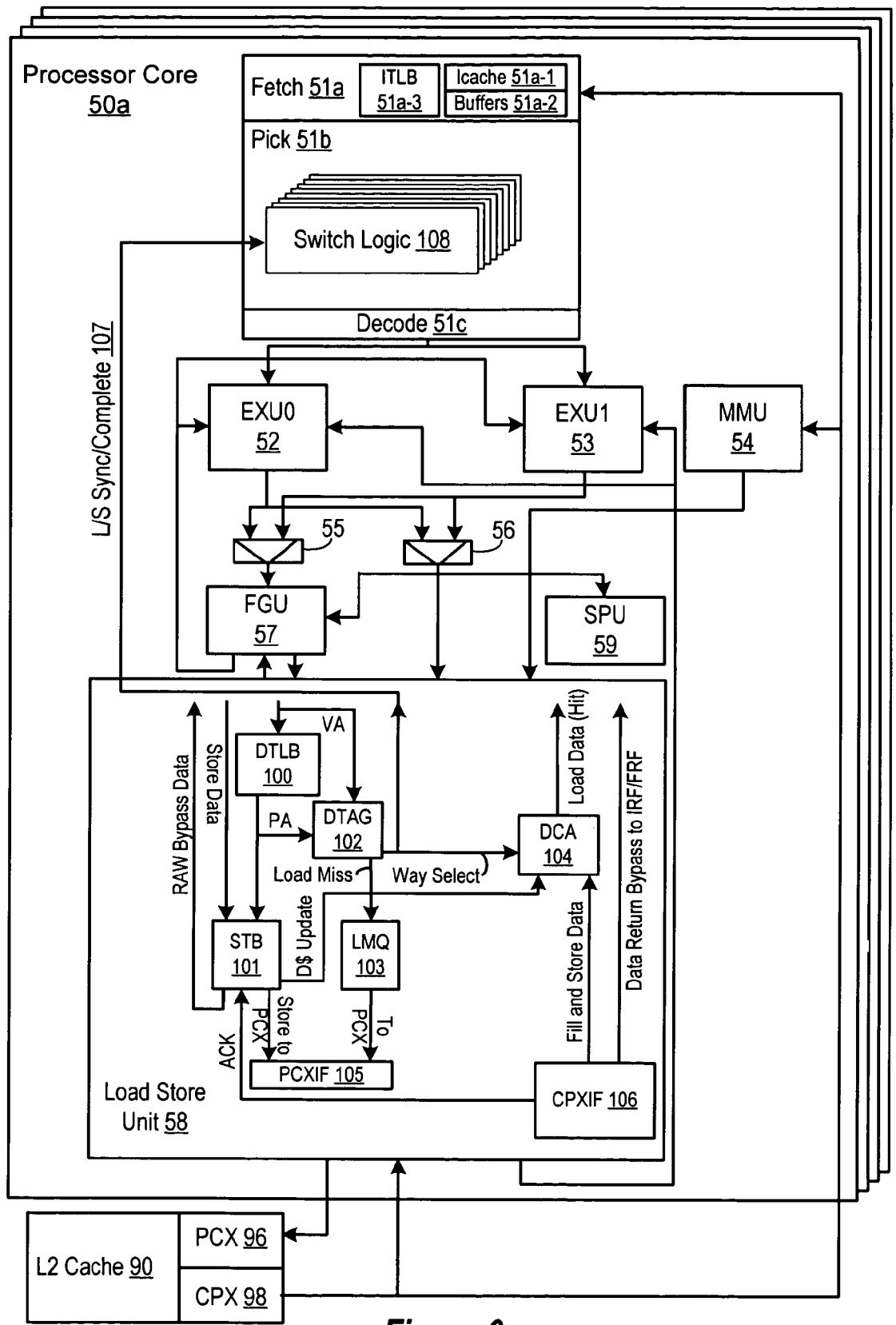
FIG. 6 is a simplified schematic block diagram of a cache miss handling system in accordance with an illustrative embodiment of the invention.

FIG. 6 illustrates a simplified schematic block diagram of a multithreaded pipelined processor system in accordance with an illustrative embodiment of the invention in which the processor core operations are optimized to expedite pipeline operations when a cache miss occurs. In the illustrative embodiment depicted in FIG. 6, each processor core (e.g., 50*a*) may be configured to perform fine-grained horizontal multithreading operations. The depicted core 50*a* includes an instruction fetch unit (IFU) 51 that is coupled to a memory management unit (MMU) 54 and at least one instruction execution unit (IEU) 52, 53. Each of execution units 52, 53 is coupled via connection circuits 55, 56 to both a floating point/graphics unit (FGU) 57 and a load store unit (LSU) 58. FGU 57 is coupled to a stream processing unit (SPU) 59. Additionally, LSU 58, IFU 51 and MMU 54 are coupled directly or indirectly to the L2 cache 90 via crossbar 96, 98. The instruction fetch unit (IFU) 51 retrieves instructions for each thread and stores them in an instruction cache 51*a*-1 and instruction buffers 51*a*-2 in the fetch unit 51*a*. Pick unit 51*b* then selects two instructions to execute among eight different threads, and provides the instructions to the decode unit 51*c* which decodes one instruction each from two thread groups per cycle and supplies the pre-decoded instruction to the execution units 52, 53. Each integer execution unit includes an arithmetic logic unit (ALU), shifter, integer register files for processing and storing thread status information. Execution unit results are supplied via selection circuits 55, 56 to the shared FGU 57 and LSU 58. The shared LSU 58 handles load and store memory references between the processor core 50*a*, the L1 data cache 102, 104, and the L2 cache 90. For store instructions, the LSU 58 uses a store buffer (STB) 101 for holding all outstanding store instructions that are to be issued in age order (per thread) through the PCX interface 105 to the L2 cache 90. The STB 101 may be threaded and contain eight entries per thread. Once a store operation is completed (e.g., a store to the L2 cache 90), an acknowledgement signal (ACK) is returned via the CPX interface 106 to the store buffer 101 which may be used to deallocate or dequeue a store from the STB 101. For load instructions all loads to the processor core 50*a* check the STB 101 (same thread only) for read-after-write (RAW) bypass opportunities. LSU 58 may also include a load miss queue (LMQ) 103 configured to store records of pending memory accesses that have missed in data cache tag 102 and array 104. Additionally, in some embodiments LSU 58 may include logic configured to translate virtual data addresses generated by execution units 52, 53 to physical addresses, such as a Data Translation Lookaside Buffer (DTLB) 100. For additional details concerning the design and operation of the processor core and its constituent resources, see co-pending U.S. patent application Ser. No. 10/880,488, entitled "Apparatus And Method For Fine-Grained Multithreading In A Multi-Pipelined Processor Core," filed Jun. 30, 2004, and assigned to Sun Microsystems, which is hereby incorporated by reference in its entirety.

A selected embodiment of the present invention is illustrated in connection with the instruction fetch unit 51 depicted in FIG. 6 which is configured to provide instructions to the rest of the processor core (e.g., 50a) for execution. In the illustrated embodiment, IFU 51 includes a fetch unit 51a, an instruction pick unit 51b, and a decode unit 51c. Fetch unit 51a further includes an instruction cache 51a-1. However, it is contemplated that any of the techniques or features attributed to illustrated elements of IFU 51 may also be generically attributed to IFU 51, and that IFU 51 may be differently partitioned or organized in other embodiments.

In one embodiment, fetch unit 51a may include logic to maintain separate fetch addresses corresponding to each thread being executed by the processor core 50a, and to coordinate the retrieval of instructions from instruction cache 51a-2 according to those fetch addresses. For example, fetch unit 51a may be configured to maintain a plurality of discrete program counters (PC) and next program counters (NPC) corresponding respectively to each implemented thread, and to derive a thread fetch address from a respective program counter. To facilitate the fetch picking process, all threads are either in ready state or wait state. A thread that is ready can be picked for fetch. The fetch unit 51a can only pick one thread per cycle. A thread in wait is waiting for one or more conditions to resolve before it can be picked for fetch. The wait state is actually the presence of any of the different specific wait conditions. The ready state is the absence of all of the different specific wait conditions. In some embodiments, instruction cache 51a-1 may include fewer access ports than the number of threads executable on core 50a, in which case fetch unit 51a may implement arbitration logic configured to select one or more threads for instruction fetch during a given execution cycle. To ensure fairness, fetch unit 51a may implement a least-recently-fetched algorithm to select a thread to fetch. Fetch unit 51a may also implement logic to handle instruction cache misses and translation of virtual instruction fetch addresses to physical addresses, such as an Instruction Translation Lookaside Buffer (ITLB) 51a-3. Additionally, in some embodiments fetch unit 51a may include logic to predict branch outcomes and/or fetch target addresses, such as a Branch History Table (BHT), Branch Target Buffer (BTB), or other suitable structures, for example. In a selected embodiment, this logic is used to predict that a load will hit the data cache in order to minimize bubbles in the pipeline.

In one embodiment, fetch unit 51a may be configured to concurrently maintain a pool of fetched, ready-for-issue instructions drawn from among each of the threads being executed by the processor core 51a. In the illustrated embodiment, fetch unit 51a includes a plurality of instruction buffers 51a-2, where each instruction buffer corresponds to a respective one of the threads that the processor core 50a is concurrently capable of executing. For example, in embodiments where the processor core 50a is configured to concurrently execute eight threads, instruction buffers 51a-2 may include eight corresponding buffers. In some embodiments, each of instruction buffers 51a-2 may be configured to store one or more instructions fetched from a respective thread before those instructions are issued for execution, and multiple buffers may concurrently store instructions from their respective threads. For example, in some embodiments fetch unit 51a may be configured to concurrently fetch several instructions from a given thread when it is possible to do so (e.g., if the fetch hits in instruction cache 51a-1 and the fetch pattern is sequential, or under other suitable conditions). By buffering multiple fetched instructions from a given thread within instruction buffers 51a-2, the fetch process may be decoupled from the process of maintaining instructions from the given thread available for issue, such that instructions from the given thread may be able to issue from instruction buffers 51a-2 independently of whether the given thread is currently being fetched from instruction cache 51a-1.

The threads implemented by a processor core (e.g., 50a) may be divided into several thread groups in some embodiments, where each thread group may be a subset of the implemented threads. In the illustrated embodiment, IFU 51 may be configured to assign a given thread to one of two thread groups denoted TG0 and TG1. In one embodiment, this assignment may be made statically; that is, thread group membership may not change over time. For example, in an embodiment of the processor core 50a implementing eight threads, IFU 51 may statically assign threads 0-3 to TG0 and threads 4-7 to TG1. In another embodiment, assignment of threads to thread groups may be dynamic; that is, IFU 51 may assign a thread to a given thread group and may subsequently reassign that thread to a different thread group. For example, in embodiments where execution resources are associated with particular thread groups, IFU 51 may be configured to reassign threads to different thread groups to facilitate scheduling and resource utilization. It is contemplated that in various embodiments, an arbitrary number of thread groups may be employed, and that thread groups need not include identical numbers of threads.

Pick unit 51b may be configured to select one or more previously fetched instructions to be issued for execution. In the illustrated embodiment, pick unit 51b may be configured to attempt to select one instruction for execution from each thread group (i.e., TG0 and TG1) out of instruction buffers 51a-2, such that two instructions may be selected for execution during a given execution cycle. For example, pick unit 51b may employ a least-recently-picked (LRP) algorithm in which the least recently picked thread within a given thread group that is ready for execution is selected. It is noted that in one embodiment, thread fetching as performed by fetch unit 51a and instruction selection as performed by pick unit 51b may be largely independent of one another.

In some embodiments, pick unit 51b may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 51b may be configured to select more or fewer than two instructions for execution in a given execution cycle, or may select instructions from all threads rather than specific groups of threads. For example, in one embodiment, pick unit 51b may be configured to select instructions for issue from among all threads and to dynamically assign selected instructions to particular thread groups. Additionally, in one embodiment pick unit 51b may be configured to identify source operand dependencies that a given picked instruction may have on a previously issued instruction, and may configure other logic to appropriately select source operands (e.g., from a register file, or from a previous execution cycle via bypass logic).

To prevent threads from being needlessly flushed from the pipeline when a cache load miss occurs, a selected embodiment of the present invention detects when the thread (in which the cache load miss occurs) has no follow-on instructions in the pipeline so that flush operations are implemented only when there is a follow-on instruction in the pipeline. This detection functionality may be implemented with thread detection or switch logic 108 in the pick unit 51b that detects if an instruction after a load miss is still in the pipeline. When the pick unit 51b is implemented as a threaded unit, the switch logic 108 of the pick unit 51b is also maintained on a per-thread basis (as indicated with the layered representation of the switch logic block in FIG. 6). For each thread, the switch logic 108 keeps track of whether or not a valid instruction is at one of the pipeline stages (e.g, the pick, decode, execute, memory, bypass and writeback pipeline stages 72-77). When implemented in connection with a pipeline having additional stages (such as additional floating point stages), the pick unit 51b may also keep track of the additional pipeline stages.

In operation, when a load instruction reaches the bypass stage 76 of the pipeline, the LSU 58 issues a load miss signal, such as an "LSU Sync" signal 107, if the load misses the data cache. The load miss signal 107 is sent to the instruction fetch unit 51 and is used to trigger the switch logic 108. The switch logic 108 looks at signal 107 during the next cycle, and if any valid instructions for that thread are detected at the decode, execute, memory or bypass pipeline stage(s) 73-76, the switch logic 108 initiates a flush of all instructions from the thread after the load and refetches instructions at the next program counter (NPC) value of the load. While a variety of techniques could be used to track the thread status in the pipeline, in a selected embodiment, the valid bits are simply piped down from pick stage 70 to writeback stage 77, taking flushes into account. As will be appreciated, flushes may be due to branch mis-predicts (any taken branch), annulment of delay slots (only at pick or decode stages), load flushes and trap flushes.

If the switch logic 108 for a thread determines that no flush is required, the thread will simply enter the wait state. For this case, the NPC of the load is at the pick stage 72, since no other instruction has followed the load down the pipe. The thread enters the wait state because the thread has missed the data cache, and it will be many cycles until the data comes back. When the data comes back (i.e., from the L2 cache 90, external memory or some other higher order memory), the LSU 58 issues an "LSU Complete" signal 107 to the corresponding thread's switch logic 108. The "LSU Complete" signal 107 causes the thread to transition from wait to ready, at which time the thread is eligible for the pick stage 72.

In accordance with the foregoing, when the processor core is designed to always speculate that load instructions will hit the data cache, the switch logic 108 is included to respond to a cache load miss indication (such as provided by the "LSU Synch" signal) to suppress a load flush if no instructions from the thread have made it down the pipeline. On the other hand, if instructions after the load have made it down the pipeline and an "LSU Sync" signal issues, the thread is flushed and instructions are refetched beginning at the NPC of the load.

Decode unit 51c may be configured to further prepare instructions selected by pick unit 51b for execution and to issue instructions to appropriate execution units. In the illustrated embodiment, decode unit 51c may be configured to identify the specific type of a given instruction, such as whether the instruction is an integer, floating point, load/store, or other type of instruction, as well as to identify operands required by the given instruction. Decode unit 51c may take type information as well as thread group information into account when issuing instructions; for example, decode unit 51c may issue integer instructions from a particular thread group to an execution unit 53, 54 associated with that thread group. Additionally, decode unit 51c may be configured to detect and respond to scheduling hazards not detected during operation of pick unit 51b. For example, in the illustrated embodiment, only one load store unit 58 is provided. Consequently, if two load/store-type instructions were picked for execution, decode unit 51c may be configured to cancel or stall one of those instructions and allow the other to be issued.

In such an embodiment, decode unit 51c may employ an arbitration algorithm to determine which instruction to issue without favoring a particular thread or thread group. Numerous other types of scheduling and resource hazards detectable by decode unit 51c are possible and contemplated.

Pick unit 51b and decode unit 51c, in the illustrated embodiment, may collectively participate in the scheduling and issuance of instructions for execution, and may collectively be referred to as scheduling logic. In other embodiments, the task of instruction scheduling (e.g., detecting hazards and dependencies, either before or after selecting threads from which to issue instructions) may be divided differently among these or other functional units, or implemented in a single functional unit. In some embodiments employing thread groups, the issuance of instructions from any thread in a particular thread group may be stalled. For example, an entire thread group may be stalled due to a pipeline hazard, such as a potential writeback conflict between a shorter-latency instruction and a longer-latency instruction within the thread group. In some such embodiments, IFU 51 may allow issuance of instructions from a thread group other than the stalling thread group. Also, in some embodiments, the issuance of instructions from a particular thread may be stalled. For example, a particular thread may experience a load miss, and may consequently stall until load data is returned from off-core. In some such embodiments, IFU 51 may allow issue of instructions from threads other than the stalling thread to proceed. For example, in embodiments employing thread groups, if a particular thread in a given thread group stalls, IFU 51 may allow instructions from any other non-stalled thread in the given thread group to issue. It is contemplated that in a fine-grained multithreaded embodiment of the processor core 50a, IFU 51 may be configured to issue an instruction from a first thread during one execution cycle, and to issue another instruction from a second thread during a successive execution cycle, such that back-to-back instructions in the execution pipeline may correspond to different threads, as described in greater detail herein in conjunction with the description of FIG. 6.

Figure 7:
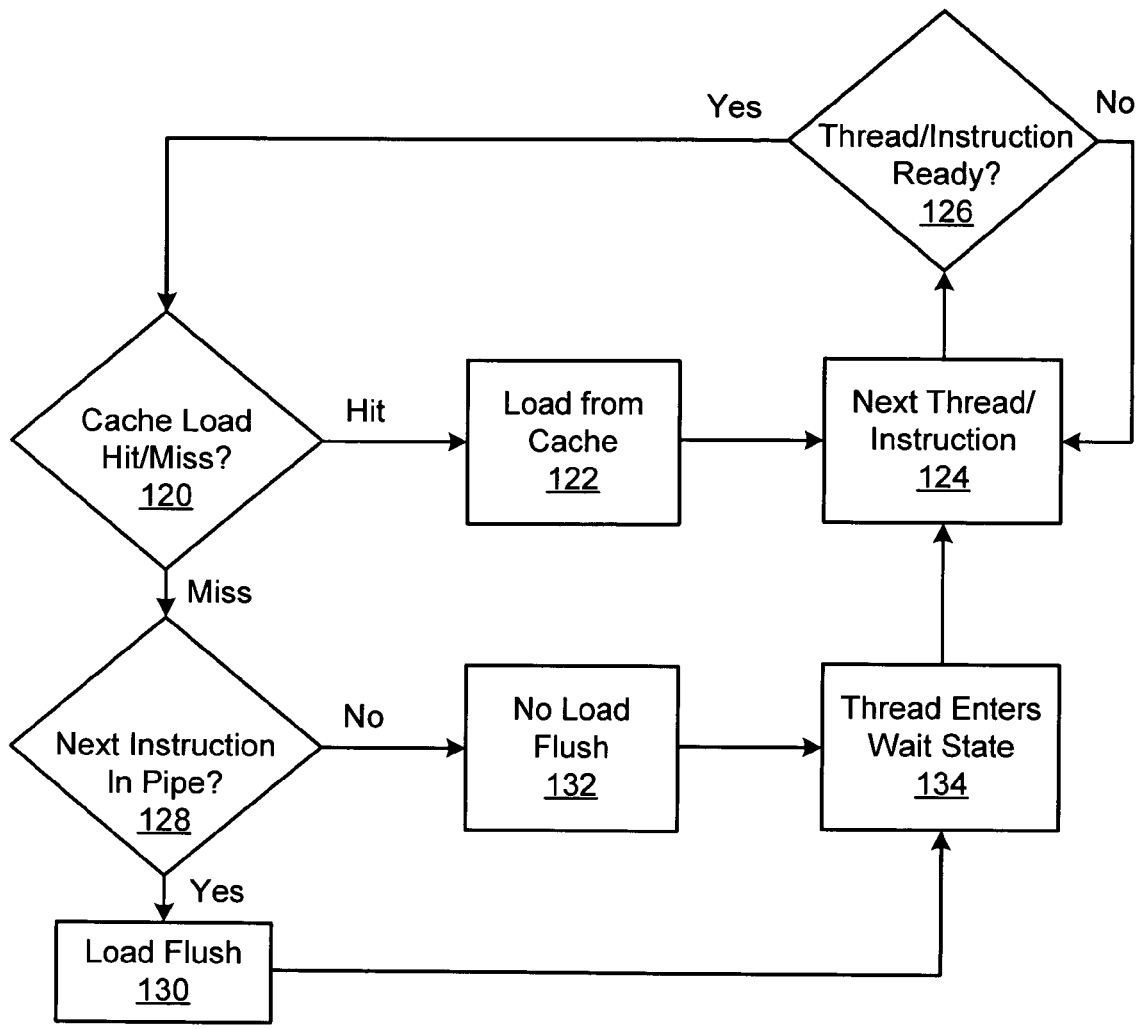
FIG. 7 depicts an exemplary flow methodology for managing cache miss operations.

Turning now to FIG. 7, an exemplary method is illustrated for handling cache miss operations, such as occur during L1 data load misses. The method reduces thread flush and re-fetch operations in a pipelined processor that would otherwise arise from load misses to the cache. As will be appreciated, the methodology illustrated in FIG. 7 follows the processing of a series of instructions for a given thread as they are processed by the processor pipeline. In a multithreaded processor implementation, the disclosed methodology may be implemented in a pipelined fashion for each thread to more efficiently manage the cache operations pertaining to each thread.

The methodology may be described by starting with step 120, where a load request is presented to the cache memory (e.g., the L1 data cache) and it is detected if the load hit or missed the cache (decision 120). With reference to the example described herein, the LSU detects a data cache hit at the bypass stage 76 and the data cache array 104 issues a "Load Data (Hit)" signal. If the load hits the cache ("hit" outcome from decision 120), the load is serviced from the cache (step 122) and the next instruction or thread is processed (step 124) and processed if it is in the ready state (step 126).

On the other hand, if it is determined that the load request missed the cache ("miss" outcome from decision 120), the miss is detected by the LSU 58 at the bypass stage 76 and issues an "LSU Sync" signal 107 to the switch logic 108. In response to the "LSU Sync" signal, the switch logic 108 determines if the next instruction in the thread behind the load request is in the pipeline (decision 128). If a follow-on instruction is in the pipeline (affirmative outcome to decision 128), then the pipeline is flushed (step 130) and the thread enters a wait state (step 124) until the requested load data is returned (e.g., from the L2 cache 90). As indicated, the process continues to retrieve the next instruction or thread (step 124) while the current thread is in a wait state. If the next thread or instruction is ready (affirmative outcome to decision 126), the process starts again, but if not (negative outcome to decision 126), the next thread or instruction is retrieved (step 124), and so on until the instruction buffer fills.

In the case of a cache miss where there the switch logic 108 does not detect any follow-on instructions in the pipeline (negative outcome to decision 128), then no thread flush is required (step 132), and the thread is directly placed in a wait state (step 134). As will be appreciated by persons of ordinary skill in the art, the indicated step 132 ("No Load Flush") is provided only to illustrate the fact that flush operations are avoided, and there is no affirmative step required to meet this negative requirement.

As will be appreciated, the methodology of the present invention may be thought of as performing the identified sequence of steps in parallel (as depicted in FIG. 7), though the steps may also be performed sequentially, in a different order or as independent operational loops. In addition, where the threads are implemented to be architecturally independent of one another, then methodology depicted in FIG. 7 can be run for each thread on each processor of any multithreaded and/or multiprocessor system.

As described herein, cache handling operation and control is optimized by imposing a flush and re-fetch penalty only when required by the thread status. Not only is the fetch bandwidth and timing performance improved at each processor core, but the overall performance of a multiprocessor embodiment is improved by reducing unnecessary memory requests to the L2 cache and memory when re-fetching instructions for the pipeline. In a selected embodiment, this is implemented by using the LSU Sync or other cache miss signal to control pipeline flushes so that they occur only when required by the presence of a subsequent instruction for that thread in the pipeline. In a highly threaded system, pipeline throughput is improved by keeping thread flushes and instruction re-fetches to a minimum.

As set forth above, a method and apparatus for managing cache miss operations is described. For clarity, only those aspects of an illustrative chip multithreading (CMT) processor application are described, and product details well known in the art are omitted. For the same reason, the computer hardware is not described in further detail. It should thus be understood that the invention is not limited to any specific logic implementation, computer language, program, or computer. While various details are set forth in the above description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the field of microprocessor design to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

While the present invention has been particularly described with reference to FIGS. 1-7 and with emphasis on certain memory structures, it should be understood that the figures are for illustration purposes only and should not be taken as limitations upon the present invention. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A single chip multithreaded processor comprising:
   at least one processor core comprising a plurality of resources for forming a pipeline that generates one or more load instructions, said processor core comprising:
   an instruction fetch unit for providing instructions to said pipeline, said instruction fetch unit comprising thread detection logic for monitoring the status of each thread in the pipeline; and
   a cache unit for servicing load instructions from the pipeline;
   wherein there are a plurality of threads in the pipeline simultaneously,
   wherein said pipeline is arranged to switch from a first thread of the plurality of threads containing a first load instruction that misses the cache unit to a second thread, and, only when the thread detection logic detects a follow-on instruction in the pipeline from the first thread to the first load instruction, flush the first thread, and
   wherein said instruction fetch unit places the first thread in a wait state without flushing the first thread when the first load instruction misses the cache unit and the thread detection logic detects no instructions in the pipeline that are from the first thread and subsequent to the first load instruction.

2. The single chip multithreaded processor of claim 1, where the cache unit issues a load miss signal to the instruction fetch unit that is used to trigger the thread detection logic.

3. The single chip multithreaded processor of claim 1, wherein the instruction fetch unit comprises a pick unit for tracking the progress of thread instructions through the pipeline.

4. The single chip multithreaded processor of claim 1, wherein the pipeline comprises a decode stage, an execute stage, a memory stage and a bypass stage, where the bypass stage determines whether a hit or miss occurred in the cache unit.

5. The single chip multithreaded processor of claim 1, wherein the pipeline comprises a plurality of pipeline stages, and where the thread detection logic keeps track, for each thread, of whether a valid instruction is at any of the plurality of pipeline stages.

6. The single chip multithreaded processor of claim 1, wherein the cache unit comprises a first level data cache.

7. The single chip multithreaded processor of claim 1, wherein said instruction fetch unit places the first thread in a ready state from the wait state once the first load instruction is serviced by higher order memory.

8. The single chip multithreaded processor of claim 1, wherein said pipeline flushes any thread containing a load instruction that misses the cache unit without flushing any other threads from the pipeline.

9. A processor system comprising at least one pipelined processing element and a cache memory, said pipelined processing element comprising:
a plurality of pipeline stages that generates load instructions to the cache memory for at least a first thread;
a memory controller for generating a cache miss signal when a load instruction in the first thread misses the cache memory; and
means for switching from the first thread to a second thread in response to the cache miss signal and, only if an instruction after the load instruction in the first thread is at any of the plurality of pipeline stages, flushing instructions of the first thread from the plurality of pipeline stages,
wherein there are a plurality of threads in the plurality of pipeline stages simultaneously, and
wherein the means for flushing suppresses the flushing of the first thread from the plurality of stages in response to the cache miss signal if no instruction after the load instruction in the first thread is detected at any of the plurality of pipeline stages.

10. The processor system of claim 9, wherein said processing element is constructed on a single integrated circuit.

11. The processor system of claim 9, wherein the pipelined processing element comprises:
a plurality of pipeline stages that generates load instructions to the cache memory for a plurality of threads;
a memory controller for generating a cache miss signal when a load instruction in a first thread misses the cache memory; and
means for flushing only the first thread from the plurality of pipeline stages in response to the cache miss signal only if an instruction after the load instruction in the first thread is detected at any of the plurality of pipeline stages.

12. The processor system of claim 9, where the cache memory comprises a first level data cache memory.

13. The processor system of claim 9, wherein the memory controller comprises a load store unit and the means for flushing comprises an instruction fetch unit.

14. The processor system of claim 13, wherein the instruction fetch unit stalls instructions from the first thread when a load instruction in the first thread misses the cache memory until load data is returned to the processing element.

15. The processor system of claim 13, wherein the instruction fetch unit comprises:
a fetch unit; and
a pick unit comprising switch logic for detecting if an instruction after the load instruction in the first thread is present at any of the plurality of pipeline stages.

16. In a multithreaded processor comprising a cache memory and an instruction fetch unit for issuing instructions to a pipeline, a method for handling cache misses, comprising:
processing a plurality of threads with a pipelined processor core comprising a plurality of pipeline stages;
issuing a memory request from a first thread to the cache memory;
issuing a cache miss signal if the memory request from the first thread misses the cache memory; in response to the cache miss signal, switching to a second thread and, only when one or more of the plurality of pipeline stages contains an instruction from the first thread that is subsequent to the memory request, flushing from the plurality of pipeline stages all instructions in the first thread that are subsequent to the memory request; and
entering the first thread into a wait state and suppressing the flushing of the first thread from the plurality of pipeline stages, when none of the plurality of pipeline stages contains an instruction from the first thread subsequent to the memory request,
wherein there are a plurality of threads in the plurality of pipeline stages simultaneously.

17. The method of claim 16, where the cache memory comprises a first level data cache memory and wherein the cache miss signal indicates that the memory request missed the first level data cache memory.

18. The processor of claim 1, wherein the pipeline is arranged so that if an other load instruction that is in the pipeline and contained by another thread different from the first thread misses the cache unit, the pipeline will switch from the other thread and, only if the thread detection logic detects an instruction that is contained in the other thread and in the pipeline and that is subsequent in the other thread to the other load instruction, flush all instructions of the other thread that are in the pipeline and subsequent to the other load instruction.

19. The processor of claim 1, wherein the pipeline is arranged so that if an other load instruction that is in the pipeline and contained by another thread different from the first thread misses the cache unit, the pipeline will switch from the other thread and, only if the thread detection logic detects an instruction that is contained in the other thread and in the pipeline and that is subsequent to the other load instruction, flush from the pipeline all instructions that are both contained in the other thread and located in the pipeline between the other load instruction and the instruction fetch unit.

20. The system of claim 9, wherein the flushing instructions of the first thread comprises flushing from the pipeline all instructions of the first thread that are in the pipeline and subsequent to the load instruction.

21. The method of claim 16, comprising: in response to the cache miss signal and only if one or more of the plurality of pipeline stages contains an instruction from the first thread that is subsequent to the memory request, flushing from the plurality of pipeline stages all instructions in the first thread that are between the instruction fetch unit and the memory request.

* * * * *